(12) United States Patent
Michaelis (10) Patent No.: US 8,687,536 B2
(45) Date of Patent: Apr. 1, 2014

(54) METHOD AND APPARATUS TO CREATE MULTICAST GROUPS BASED ON PROXIMITY

(75) Inventor: Oliver Michaelis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 848 days.

(21) Appl. No.: 12/035,358

(22) Filed: Feb. 21, 2008

(65) Prior Publication Data

US 2008/0219227 A1   Sep. 11, 2008

Related U.S. Application Data

(60) Provisional application No. 60/891,231, filed on Feb. 23, 2007.

(51) Int. Cl.
*H04H 20/71* (2008.01)
*H04L 12/28* (2006.01)
(52) U.S. Cl.
USPC ............................. 370/312; 370/390; 370/432
(58) Field of Classification Search
None
See application file for complete search history.

(56) References Cited

U.S. PATENT DOCUMENTS

| 6,988,146 | B1 | 1/2006 | Magret et al. |
| 2005/0063409 | A1* | 3/2005 | Oommen ...................... 370/432 |
| 2005/0138369 | A1* | 6/2005 | Lebovitz et al. .............. 713/163 |
| 2006/0029078 | A1* | 2/2006 | Lu et al. ...................... 370/395.2 |
| 2006/0034215 | A1* | 2/2006 | Moon et al. ................... 370/328 |
| 2006/0072532 | A1 | 4/2006 | Dorenbosch et al. |
| 2007/0001853 | A1* | 1/2007 | Otranen ..................... 340/572.1 |
| 2009/0313689 | A1* | 12/2009 | Nystrom et al. .................. 726/9 |

FOREIGN PATENT DOCUMENTS

| JP | 2006054616 A | 2/2006 |
| JP | 2008524906 A | 7/2008 |
| WO | WO2006064480 A1 | 6/2006 |

OTHER PUBLICATIONS

International Search Report—PCT/US08/054783—International Search Authority—European Patent Office—Jun. 24, 2008.
Written Opinion—PCT/US08/054783—International Search Authority—European Patent Office, Munich—Jun. 24, 2008.

* cited by examiner

*Primary Examiner* — Yemane Mesfin
*Assistant Examiner* — Christine Duong
(74) *Attorney, Agent, or Firm* — James T. Hagler (57) ABSTRACT

Devices and methods use close range communication links, such as near field communication (NFC) protocol links, to enable users to authenticate mobile devices to one another to create or expand secure multicast groups. Once the two or more devices establish a close range communication peer-to-peer link the devices exchange multicast group communication data sufficient to permit the devices to receive or send multicast messages. Long range wireless or wired network communication links are then used for multicast message communications. Proximity limits of the close range communication P2P link enables mutual trust to be presumed among devices, reducing the need for security and authentication signaling. The limited range of close range communication P2P links renders multicast groups established in this manner less vulnerable to eavesdropping and intrusion. Embodiments enable users to initiate secure multicast group participation merely by bringing two or more devices into close proximity.

40 Claims, 8 Drawing Sheets

<capabilities>

```
<protocol>
    <name>IP</name>
    <identifier>192.168.0.1</identifier>
</protocol>
```
110

```
<protocol>
    <name>EVDO</name>
    <identifier>555-555-1212</identifier>
</protocol>
```
115

</capabilities>

METHOD AND APPARATUS TO CREATE MULTICAST GROUPS BASED ON PROXIMITY

RELATED APPLICATIONS

The present application claims the benefit of priority to U.S. Provisional Patent Application No. 60/891,231 filed Feb. 23, 2008 entitled "Method and Apparatus to Create Multi-Cast Groups Based on Proximity," the entire contents of which are hereby incorporated by reference.

FIELD OF THE INVENTION

The present invention relates generally to computer network communications, and more specifically to creating multicast groups based on proximity.

BACKGROUND

As mobile devices and consumer electronic devices target converging markets there is increasing interest in multicast communication technologies. In multicast groups, multiple participants are linked together into an inter-network in which the participants send and receive communications to and from one another. Such networks have a variety of useful applications, from business collaboration to interactive gaming. Multicast groups are not without their hazards, however, as members have communication access to all members of the group. Allowing an intruder into a multicast group could leave members vulnerable to electronic attack and eavesdropping. Accordingly, most multicast groups employ some form of security or authentication protocols to limit group access. Such mechanisms may work well in established and stable groups. However, ad hoc multicast groups and groups that frequently add and delete members may become burdened by such security or authentication protocols.

SUMMARY

In the various embodiments a wireless proximity-limited communication technology is used to establish an initial link between mobile devices to recognize one another and establish a multicast group. A variety of wireless proximity-limited communication technologies may be used for mobile devices (e.g., cell phones, PDAs, and other wireless devices) to establish a peer-to-peer (P2P) data link. After the P2P link has been configured with wireless proximity-limited communication, another wireless communication technology, such as Bluetooth® or Wi-Fi, can be used for longer-range communication or for transferring larger amounts of data. The longer-range communication technology can then be used as the medium for establishing a multicast group. Since wireless proximity-limited communication technologies are limited to short ranges, this self establishing wireless communication link provides an intuitive mechanism for users to authenticate mobile devices to a multicast group and to initiate multicast group participation merely by bringing two or more mobile devices into close proximity.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "mobile handset," "handset," "mobile device" and "handheld device" refer to any one or all of cellular telephones, personal data assistants (PDA's), palm-top computers, wireless electronic mail receivers and cellular telephone receivers (e.g., the Blackberry® and Treo® devices), multimedia Internet enabled cellular telephones (e.g., the iPhone®), and similar personal electronic devices which include a programmable processor and memory and the capability to connect to a wireless network. While the various embodiments refer to cellular telephone network systems including cell towers of such networks, the scope of the present invention and the claims encompass any wireless communication system including disperse communication cells centered on base stations which include an identifier, including for example, WiFi, WiMax, and other wireless data network communication technologies.

The various embodiments make use of wireless proximity-limited communication technologies to impose the need to bring two electronic devices to exchange information necessary to establish a multicast group. A variety of wireless proximity-limited communication technologies may be used for this purpose. For example, close range communication link technologies, such as near field communications (NFC) protocol technologies, may be used. NFC protocol technology devices operate in the unregulated RF band of 13.56 MHz and fully comply with existing contactless smart-card technologies, standards, and protocols such as FeliCa and Mifare. NFC protocol-enabled devices are interoperable with contactless smart-cards and smart-card readers conforming to these protocols. The effective NFC protocol range is approximately 0-20 cm (up to 8 in.) and data communications terminates either by a command from an application using the link or when the communicating devices move out of range.

Evolving from a combination of contactless, identification and networking technologies, NFC protocol is a short-range wireless connectivity standard. A number of international standards have been established for NFC protocols, including for example: ISO/IEC 14443; ISO/IEC 15693; ISO/IEC 18092; ISO/IEC 21481; ISO/IEC 22536; ISO/IEC 23917; ISO/IEC DIS 28361; ECMA-340, referred to asNFCIP-1; ECMA-352, referred to as NFCIP-2; ECMA-356; ECMA-362; ECMA-373; ECMA/TC32-TG19/2006/057; NFC-WI; and NFC-FEC.

However, the embodiments and the claims are not limited to any one or all of the NFC protocols, and instead encompass any short range (i.e., proximity-limited) wireless communication link. Any wireless proximity-limited communication technology may be used. In addition to the NFC protocols listed above, wireless proximity-limited communication links may be established using other short range communication media, including for example radiofrequency identification (RFID) tags and the IrDA (Infrared Data Association) protocol. Also, other short range wireless protocols and standards may be developed and may be used in the various embodiments in the same manner as NFC protocol devices. Further, longer range wireless technologies and protocols may be used with modifications or additions that limit their effective range for purposes of identifying electronic devices one to another. For example, WiFi, Bluetooth® (which communicates using the 2.4 GHz frequency band), UWB (Ultra Wideband), IEEE 802.15.4, and Zigbee® wireless communication protocols and standards may also be used in combination with range-limiting features. For example, the power of transmitters may be limited for authentication communications, such that two devices must be relatively close together (e.g., within a few feet of each other) in order to send and receive the communications. As another example, round-trip communication delay limits may be imposed such that authentication communications can only occur if the round trip of such signals is less than a threshold set to reject signals sent from more than a dozen feet or so, which may be a short as two to three feet separation.

For simplicity of reference, the various embodiments and the claims refer to "close range communications" and "near field communications" in order to encompass any and all wireless proximity-limited communication technologies. References herein to "close range communication links" (CRCL) and "near field communications" are not intended to limit the scope of the description or the claims in any way other than the communications technology will not exchange credential information beyond about three meters (about twelve feet). In a preferred embodiment, the communication range is limited to less than about one meter (about three feet), in a further preferred embodiment, the communication range is limited to less than about one foot, and in some embodiments the communication range is limited to approximately 0-20 cm (up to 8 in.). In order to reflect this distinction, descriptions of embodiments using links with communication ranges of approximately 0-20 cm (up to 8 in.) are refer to "NFC protocol" links. Therefore, references to "near field communication protocol" and "NFC protocol" communications are intended to be limited to communications transceivers and technologies with ranges provided by the various NFC protocols and standards listed above, but may also include RFID transceivers and technologies with a similarly limited communication range.

With the increased adoption of radio frequency identification (RFID) contactless smart-cards to support a broad range of applications, such as access, payment, and ticketing, and the commercial availability of NFC-enabled devices such as cell phones, the convergence of NFC with RFID is gaining interest.

With close range communications technologies, like NFC protocol devices, it is possible to connect any two devices to each other to exchange information or access content and services-easily and securely. Solution vendors argue that the intuitive operation of NFC protocol systems makes the technology particularly easy for consumers to use ("just touch and go"), while the inherent security resulting from its very short communication range makes such systems ideal for mobile payment and financial transaction applications. Familiar applications of NFC protocol technology are electronic pass keys used in building security systems, mass transit fare card systems, and smart credit cards which need only to be brought close to a point of sale reader to complete a transaction.

As mobile devices and consumer electronic devices are targeting converging telecommunication markets and multicast group systems become more prevalent, the need mechanisms for establishing secure multicast groups in a user-friendly manner is becoming increasingly important. This includes simple multicast groups of devices sharing a common physical link and devices on disparate links.

Wireless proximity-limited communications technologies are limited to such short ranges that users must touch or nearly touch two devices together to establish the communication link. This physical action thus provides an intuitive mechanism for establishing a peer-to-peer (P2P) wireless communication link; if users want two devices to communicate, they merely touch them together. In the various embodiments, this touch-to-communicate mechanism is leveraged to provide an intuitive means for users to authenticate mobile devices to one another to create a multicast group or to join an established multicast group. Once the two (or more) mobile devices establish a close range communication P2P link, long range wireless or wired network communications can be established, such as by using the close range communication link to negotiate network protocol parameters. Multicast group credentials and encryption keys may also be exchanged via the close range communication P2P link. Since very close physical proximity is required to establish and maintain the close range communication P2P link, mutual trust can be presumed by the respective mobile devices. This obviates the need for involved security and authentication protocols to form or add members to a multicast group. The limited range of close range communication P2P links (e.g., NFC protocol P2P links) makes them generally invulnerable to eavesdropping and avoids issues of unwanted devices attempting to join multicast groups via long range wireless links. Thus, the various embodiments enable users to initiate secure multicast group participation merely by bringing two or more mobile devices into close proximity.

Figure 1:
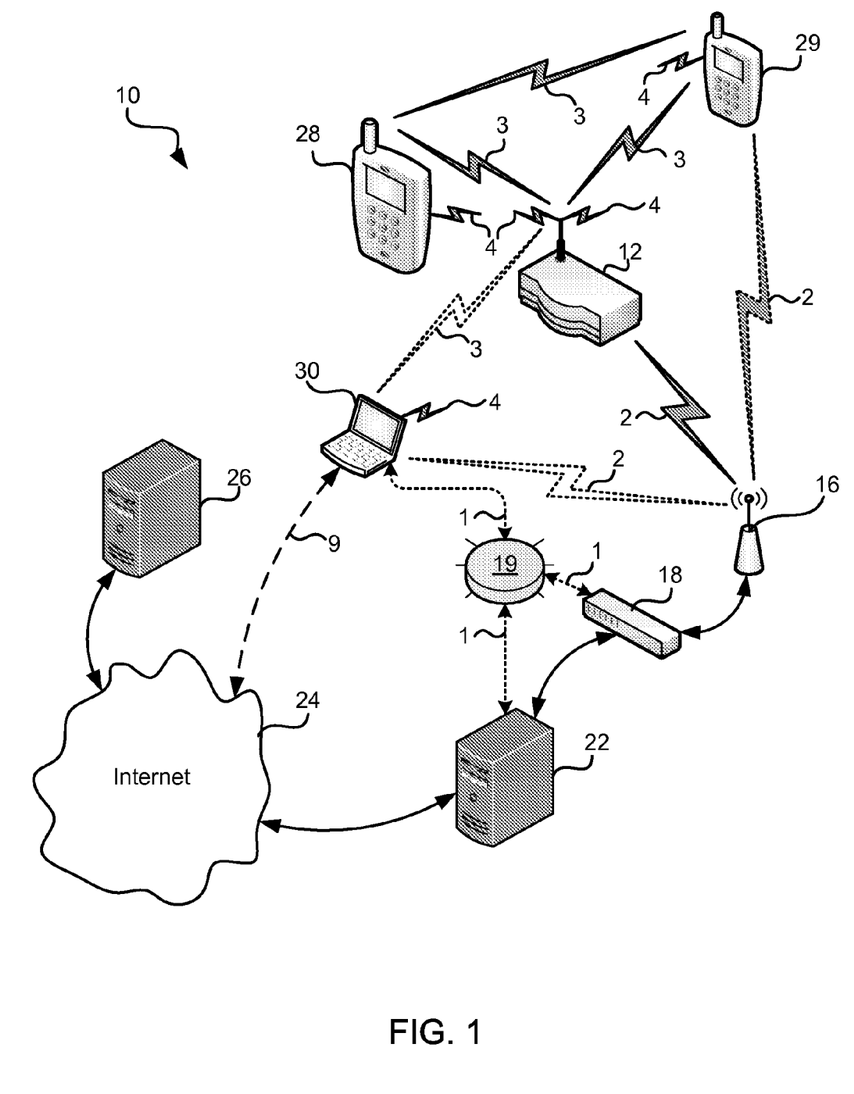
FIG. 1 is a block diagram of wireless cellular network which includes short-range wireless communication implemented on a number of mobile devices.

The various embodiments may be employed in a variety of wired and wireless networks, including for example a wireless network employing cellular data communication links. By way of example, FIG. 1 shows a block diagram of a multicast group communication network 10 including a cellular network in which some mobile cellular devices have the additional ability to function as readers of short-range wireless communications, such as NFC protocol and Radio Frequency Identification (RFID) communications. The network 10 may include a terminal 12 (typically the network will include a plurality of terminals, although for the sake of clarity only one terminal is shown), which is configured with a network antenna and transceiver for transmitting and receiving cellular signals 2 from/to a cellular base site or base station (BS) 16. In this example network 10, the base station 16 is a part of a cellular network that includes elements required to operate the network, such as a mobile switching center (MSC) 18. In operation, the MSC 18 is capable of routing calls and messages to and from the terminal 12 via the base station 16 when the terminal 12 is making and receiving calls. The MSC 18 also provides a connection to telephone landline trunks (not shown) when the terminal 12 is involved in a call. Further, the MSC can, but need not, be coupled to a server gateway 22 coupled to the Internet 24.

The MSC 18 can also be coupled to a network 19 by a wired network connection 1, such as a local area network (LAN), a metropolitan area network (MAN), and/or a wide area network (WAN). The MSC 18 can be coupled to the network 19 directly by a wired network connection 1, or if the system includes a gateway 22 (as shown), the MSC can be coupled to the network 19 via the gateway 22 which has a wired network connection 1 to the network 19. In a typical embodiment, the MSC 18 is coupled to the gateway 22, and the gateway 22 is coupled to the Internet 24. In turn, electronic devices such as a laptop computer 30 (as shown) or any other processing elements (e.g., personal computers, server computers or the like) can be coupled to the terminal 10 via the Internet 24 by way of their own Internet connection 9. In a further embodiment, one or more processing elements associated with an origin server 26 may be coupled to this network 10 by way of the Internet 24.

In addition to cellular network communications 2, the terminal 12 may be equipped to communicate with other devices, such as mobile devices 28, 29, 30 via a local wireless network 3 and a close-range communication link 4. For example, in the FIG. 1 embodiment, the terminal 12 is configured to communicate with a first mobile device 28, a second mobile device 29 and a laptop computer 30, each equipped with an internal close-range communications transceiver (e.g., for example an NFCIP-2 transceiver). The terminal 12 is also configured to communicate with these devices 28, 29, 30 via another wireless communication link, such as a local area wireless link 3. For example, the terminal 12 may include an NFCIP-2 NFC transceiver and an IEEE 802.11g wireless data network transceiver. Similarly, the mobile devices 28, 29 and the laptop computer 30 may be configured with compatible NFC and local area (or wide area) wireless transceivers.

The close range communication transceivers in the terminal 12 and the other network devices 28, 29, 30 may be any of a number of different known transceivers (including for example RFID tags) capable of transmitting and/or receiving data in accordance with any of a number of different close range communications techniques, such as defined in the international standards listed above. For example, the close range communication transceiver may be a NFCIP-1 or NFCIP-2 transceiver, an RFID transceiver or RFID tag, or use Bluetooth® (i.e., communication in the 2.4 GHz frequency band), infrared, IrDA (Infrared Data Association), UWB (Ultra Wideband) or another wireless communication link.

The terminal 12 and network devices 28, 29, 30 also include a second data communication link that can be used for transmitting data associated with a multicast group. For example, as illustrated in FIG. 1, the second data communication link may be a local area wireless link 3, such as according to the IEEE 802.11g standard. This second data communication link need not be wireless, and can be a wired local area network (not shown), such as a ring token network or an Ethernet network.

In addition to cellular telephones 28, 29 and laptop computers 30, the network 10 may also or alternatively include any of a number of different electronic devices, including other mobile terminals, wireless accessories (e.g., mass storage devices, networked printers, monitors, etc.), portable digital assistants (PDAs), pagers, desk top computers and other types of electronic systems.

FIG. 1 illustrates devices that may be members of a multicast group. For example, a multicast group may be established among the terminal 12, mobile devices 28, 29 and a lap top computer 30. An example of such a multicast group may be a home entertainment system that uses the terminal 12 as a hub for administering the multicast group. In this example, the multicast group is able to share data within the group via multicast messages transmitted by a wireless data link 3. Such multicast group transmissions may be peer-to-peer links, such as illustrated between mobile device 28 and mobile device 29, or indirect network communications via the terminal 12, such as illustrated between the mobile devices 28, 29 and the laptop computer 30. Such a multicast group may also communicate with external websites and data sources, such as by the terminal 12 communicating via a cellular data communication link 2 with a base station 16 coupled to the Internet 24 as illustrated. Similarly, one or more of the mobile devices 28, 29 may also be able to communicate directly with the base station 16, such as by a cellular data communication link 2.

The architecture illustrated in FIG. 1 also supports multicast groups that include distant elements, such as a server 26 coupled to the Internet 24. For example, a multicast group may be administered by an origin server 26 via the Internet 24. Messages intended for the multicast group may be transmitted from the origin server 26 via the Internet 24 to a base station 16 and then to the terminal 12 as illustrated. From terminal 12, the multicast group messages may be rebroadcast via local wireless communication links 3 to the other group members 28, 29, 30. Messages from any member of the multicast group may then be routed to the origin server 26 in a reverse manner. Similarly, the multicast group may include computing devices that are beyond the range of the terminal 12, such as a computer coupled to the Internet 24. Messages to and among multicast group members may be directed to each member device using IP addresses using addressing schemes that are well known in the Internet arts.

While the protocols and methods for communicating to, from and within a multicast group are well known, the various embodiments provide new mechanisms for establishing an ad hoc multicast group or for joining new members to an existing multicast group. By adding close range communication transceivers, such as NFC protocol transceivers, to the terminal 12 and group elements 28, 29, 30, the proximity limitation of close range communications links is leveraged to make two unrelated devices, such as a terminal 12 and a mobile device 28, aware of each other. Thus, to add a first mobile device 28 to a multicast group including the terminal 12 the first mobile device is brought in very close proximity to the terminal 12. Using one of the known close range communication techniques, the first mobile device 28 and the terminal 12 establish a close range communication data link 4 and exchange a multicast-based services advertisement over the close range communication data link 4. As part of exchanging a multicast services advertisement, the address of the first mobile device 28 is provided to the terminal 12 for use by the multicast group, and the multicast group address is communicated from the terminal 12 to the first mobile device 28. Additional information such as user notification and/or multicast group participation confirmation may also be addressed at this point.

As a part of the multicast services advertisement data the first mobile device 28 and the terminal 12 can exchange information to configure a specific multicast group communication link. For example, the terminal 12 may inform the first mobile device 28 of the network (such as wireless or wired network) over which the multicast group is communicating. As another example, the terminal 12 may inform the first mobile device 28 of security or encryption information needed for the first mobile device 28 to access a wireless network (i.e., establish wireless communication links 3). In this manner, the creation of a new multicast group or joining of an existing group can be negotiated and communicated between the first mobile device 28 and the terminal 12 as part of the services advertisement processing using the close range communication link 4. Once the multicast group is established or the first mobile device 28 is added to the group, link-specific signaling data can be transmitted on the multicast-capable link 1, 2, 3.

In an embodiment the first mobile device 28 and the terminal 12 have data connectivity via disparate physical links, e.g. an 802.11g wireless link 3 and a CDMA cellular data communication link 2 in addition to the close range communication link 4. In this embodiment, the multicast group can be established using the 802.11g wireless link 3, the CDMA cellular data communication link 2, or both. In a further embodiment, one or more of the group devices (e.g., the laptop computer 30) may include a wired network link 1 that can be used for multicast group communications.

A multicast proxy may be collocated with any one of the terminal 12 or other group member devices 28, 29, 30, or present in the network as a separate entity, including in an origin server 26 accessed via the Internet 24. The services advertisement data exchanged via a close range communication link 4 can be used to configure the multicast proxy in addition to the creation of a multicast group or addition of a device to an established multicast group. Each device 12, 28, 29, 30 can use its multicast-capable link (e.g., wired, wireless and/or cellular links 1, 2 or 3) to send out the configuration signaling to other members of the multicast group, and hence create the multicast group or join groups of devices over single or disparate links. Thus, once a multicast group has been established, any member of the group having close range communications (e.g., NFC protocol) capability can join another device to the group by being placed in close proximity to the new device sufficient to establish a close range communication link 4. Since the networking authentication is established by bringing two devices in close proximity and the network and multicast group addresses and set up information is communicated via the close range communication link 4, the establishment of a multicast group or joining an established multicast group can be completely transparent to the user.

The network 10 illustrated in FIG. 1 enables a variety of connections between mobile devices 28, 29 and other computing devices on the network, such as a laptop 30. For example, the multicast group can communicate by means of cellular communications networks 2, by local wireless networks 3, by wired network connections 1 accessed via cellular communication links 2 to the base station 16 via the MSC 18 and network 19, and via the Internet 24 by an Internet connection 9. This flexibility in network connections is illustrated with respect to laptop 30 with dashed communications symbols. Once a multicast group has been authenticated by close range communications procedures described herein, the group devices may communicate to each other directly through peer-to-peer links or indirectly via networks 1, 2, 3, 9, 24.

While FIG. 1 shows a terminal 12 to be an immobile terminal, this multicast group hub may itself be a mobile device, such as a cellular telephone. For example, mobile device 29 may serve as the hub of a multicast group including itself, the mobile device 28 and the laptop 30, with network communications including a cellular data network link 2 and a local area wireless link 3. In this example, once multicast group membership is confirmed by bringing the mobile device 28 in close proximity to the mobile device 29 to establish the close range communication link 4, communications to, from and among the multicast group may proceed according to well-known multicast group communication methods and protocols.

Each device that may be joined to a multicast group may be configured with application software to automatically negotiate the creation of a multicast group when any two devices are brought in close proximity. Similarly, the devices may be configured with application software to automatically join one device to an established multicast group of which the other device is a member when the two devices are brought into close proximity. Such applications using the communication capabilities of close range communications transceivers can eliminate much of the complexity of establishing secure multicast groups. The need for users to enter group identification and communication link information into one or more devices is replaced by a requirement that two devices be touched (or nearly touched) together. In this manner, an extensive multicast group can be quickly configured by simply touching the various member devices together in sequence.

In addition to providing a simple mechanism for establishing or expanding a multicast group, the various embodiments provide a secure mechanism for exchanging multicast group communication, identification and security (e.g., encryption) information. Since close range communication links 4 have short range, they are resistant to eaves dropping and interference from other devices. For example, FIG. 1 shows mobile device 28 sufficiently close to the terminal 12 to establish a close range communication link 4, while other members of the group (such as mobile device 29 and laptop computer 30) cannot receive or interfere with that communication. Since group identification and security information are not exchanged over wide-area communication links 2, 3, there is low risk of inadvertent joining of devices, or disclosing link and security information to eavesdroppers. Thus, a secure multicast group can be quickly formed in a public location without users having to enter security information.

While FIG. 1 is described above as being based upon a cellular data network, the same basic architecture may be implemented with other wireless network technologies, such as a WiFi or WiMax network. In such alternative wireless technologies, the base station 16 would be a WiFi or WiMax (for example) base station. Other elements of such a network 10 would be substantially the same as shown in FIG. 1 and described above, except that the terminal 12 and other network elements 28, 29, 30 would be configured to communicate using the WiFi (or other) wireless communication protocol. Accordingly, a separate figure for depicting alternative wireless technology networks is unnecessary, and references to components in subsequent figures using reference numerals shown in FIG. 1 are intended to encompass both cellular and other wireless network elements. Similarly, the terminal 12 may be coupled to a local area network 19 by a wired connection (similar to the wired network connection 1 shown in coupling to the laptop 30), and need not include a cellular network transceiver.

Figure 2:
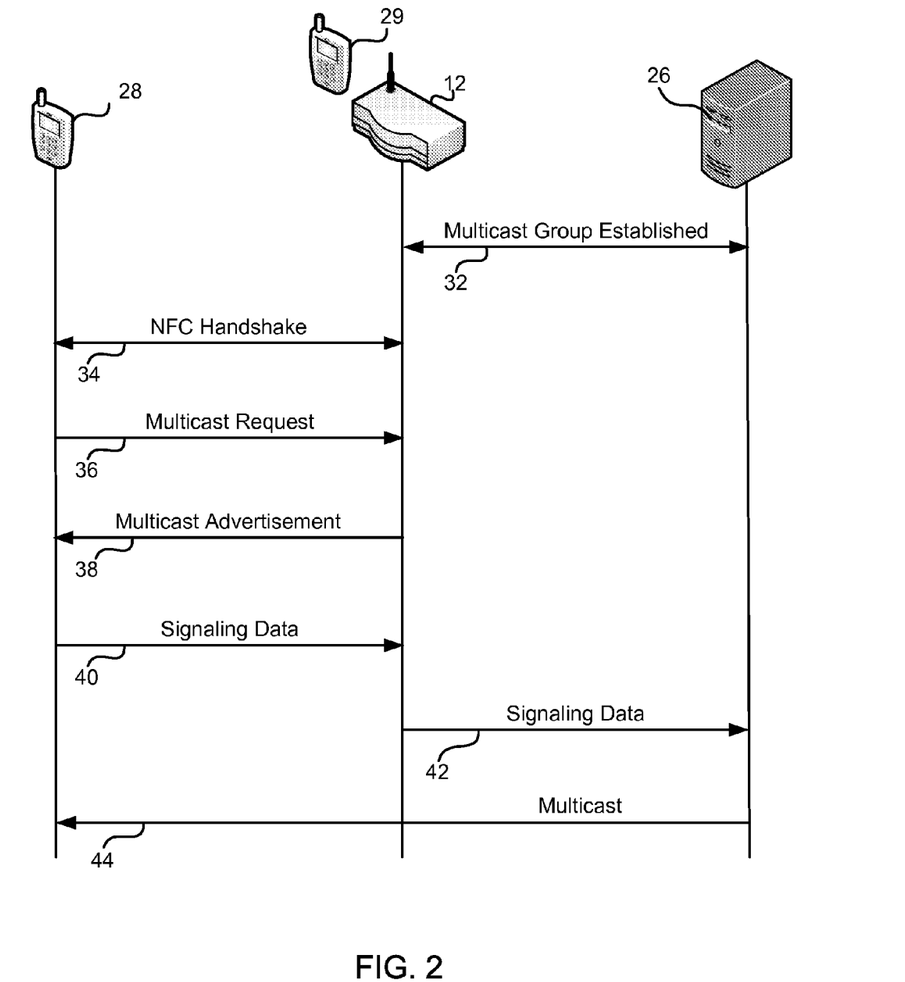
FIG. 2 is a message flow diagram of an embodiment for joining a device to a multicast group.

An overview of basic communications that may occur between devices establishing a multicast group in the various embodiment methods is illustrated in FIG. 2. In this example, the terminal 12 and origin server 26 may first establish a multicast group in a known manner by exchanging a series of multicast group advertisement and negotiation messages 32. When the first device 28 and the terminal 12 are brought into close proximity they establish a wireless close range communications link 4 using one of the known close range communication techniques (e.g., NFC protocol), messages 34. The process of establishing a close range communication link involves a series of handshaking communication exchanges encompassed within messages 34. Over the established close range communications link 4, the first device 28 may request multicast group services advertisement data from the terminal 12, message 36. The first device 28 may make this request on its own initiative, such as a standard communication transmitted each time a close range communication link 4 is established. Alternatively, the terminal 12 may inform the first device 28 that the terminal 12 is a member of an established multicast group as part of or following the close range communication establishment handshake communication messages 34. Alternatively, terminal 12 may notify the first device 28 that it is capable of sending a multicast group services advertisement.

The terminal 12 may respond to a multicast group services advertisement data request message 36 with services advertisement data corresponding to the established multicast group, message 38. The multicast group services advertisement data message 38 includes the network, addressing and security data that the first mobile device 28 needs to begin receiving multicast messages. The multicast group services advertisement data message 38 may also comprise a number of messages from the terminal 12 and, optionally, acknowledgement messages from the first mobile device 28. It should be recognized that the specific communications between the terminal 12 and the first device 28 may vary, depending on the configurations of the terminal 12 and the first mobile device 28. For example, the terminal 12 may be configured to send the multicast group services advertisement data over the close range communication link 4 without being prompted by the first mobile device 28.

Figure 6:
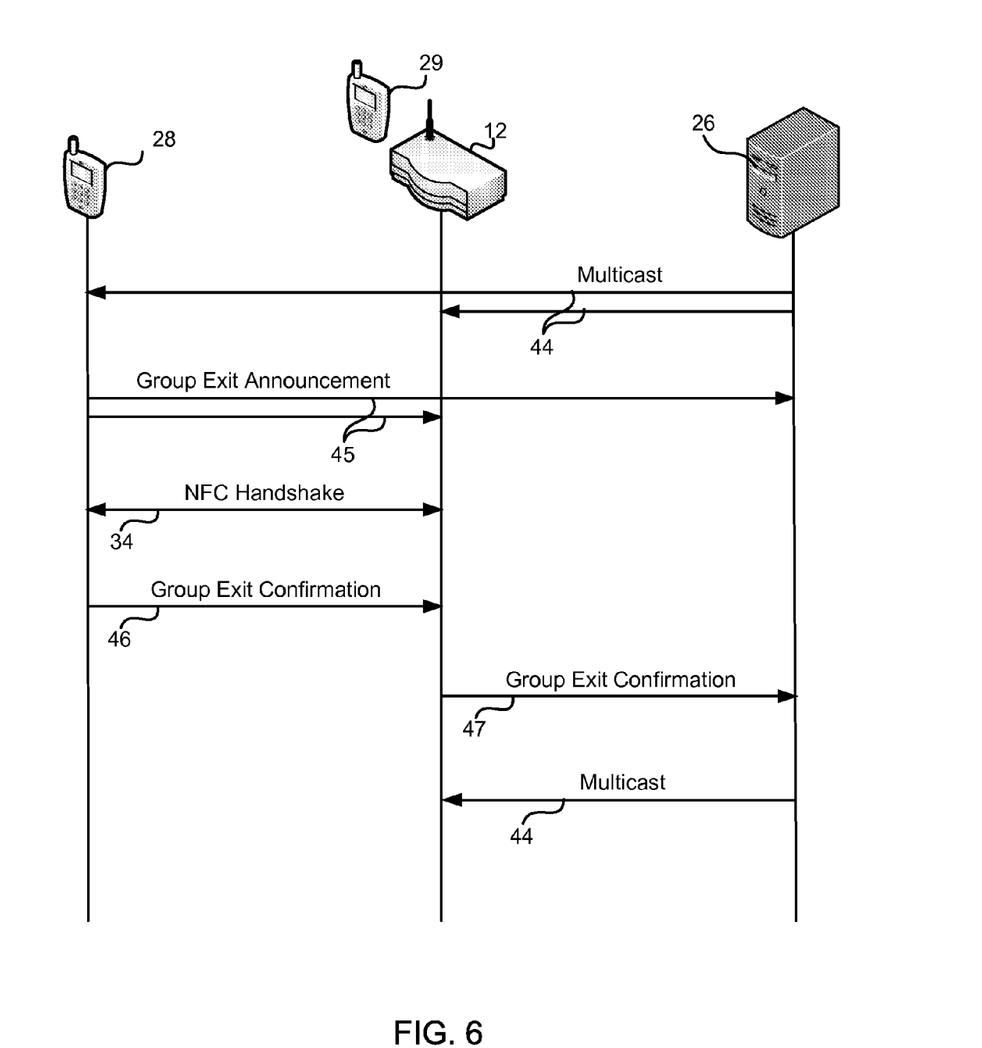
FIG. 6 is a diagram of a data structure suitable for use with the various embodiments.

The first device 28 may also transmit address, configuration and other signaling data that will enable the origin server 26 to properly add the first mobile device 28 to the multicast group. For example, the mobile device 28 may provide its IP address, its available network communication capabilities (such as whether it has a wired or wireless data connections, as well as the communication protocol version associated with each communication capability) and its communication encryption capabilities. An example of such signaling data is shown in FIG. 6, which is explained in more detail below. Such signaling data may be sent through the wireless close range communications link 4 to the terminal 12, message 40, and relayed by the terminal 12 to the origin server 26, message 42. Alternatively, the first mobile device 28 may communicate the signaling data directly to the origin server 26, such as through the Internet 24 or via a cellular data network. For example, once the first mobile device 28 has received the multicast group services advertisement data, it may use the received data to contact the origin server 26 directly to announce it is joining the group. Once the origin server 26 receives the signaling data, the multicast group may be expanded to include the first mobile device 28. Thereafter, the origin server 26 may send multicast data to the multicast group including the first mobile device 28, messages 44.

Figure 3:
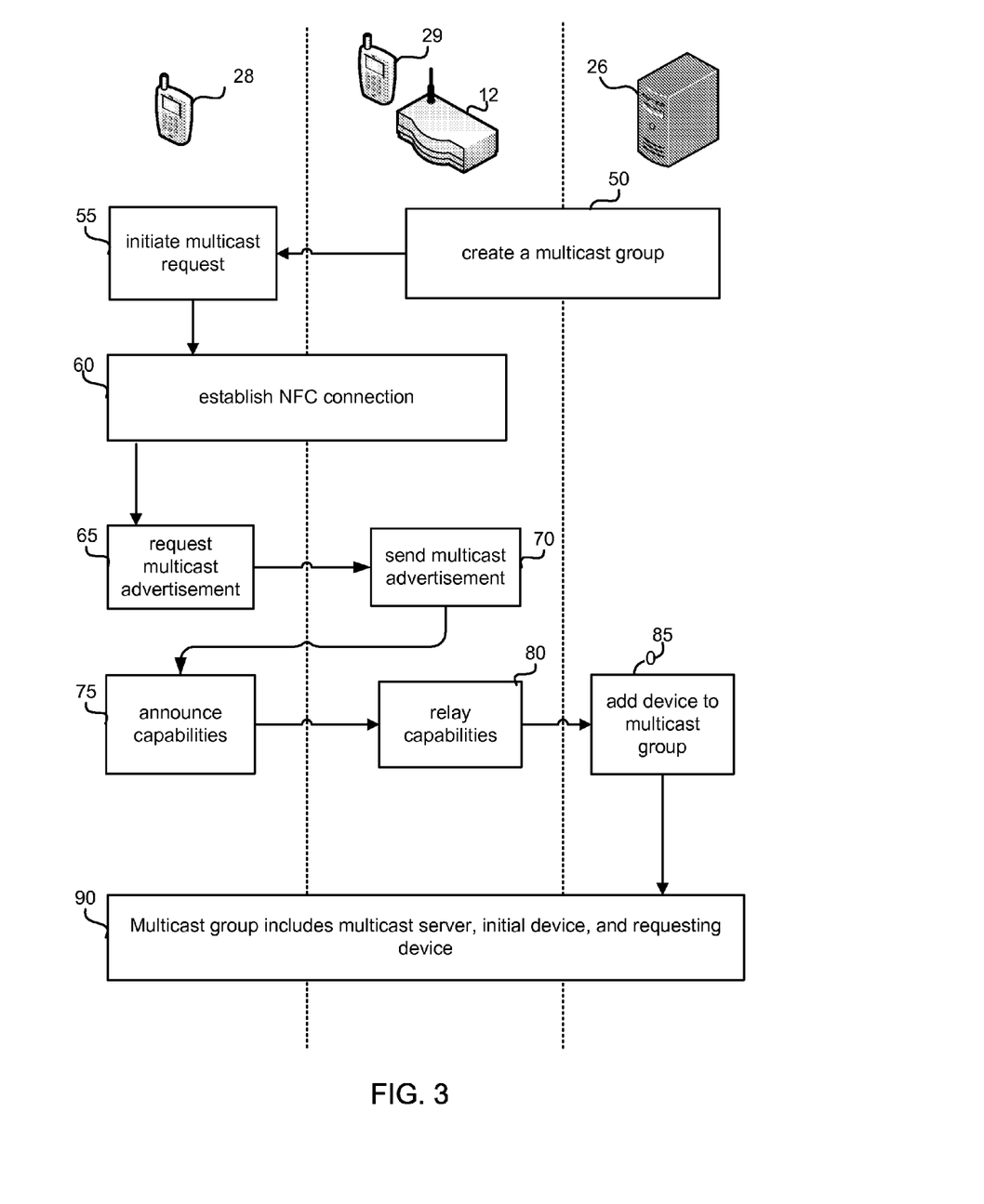
FIG. 3 is a process flow diagram of an embodiment method suitable for joining a device to a multicast group.

An embodiment method is illustrated in FIG. 3, which shows various steps that can be implemented among various devices within a multicast group. The origin server 26 and the terminal 12 create a multicast group using a known method, step 50. The user of the first mobile device 28 selects an option on the device to prepare it to join a multicast group using close range communications, step 55. The users of the first mobile device 28 and the terminal 12 establish a close range communication link between the two devices by holding the two devices within a short range of each other, step 60. The close range communication link 4 is established automatically as soon as the two devices are within communication range using one of the various close range communications technologies (e.g., NFC protocol technology). When the close range communication link 4 is established, the first mobile device 28 sends a request for a multicast group services advertisement over the link, step 65. As noted above, this step 65 of requesting the multicast service advertisement may be performed automatically in response to establishing the close range communication link, or may be accomplished in response to receiving information from the terminal 12 that a multicast group is established which the first mobile device 28 can join. The terminal 12 receives the services advertisement request and responds with services advertisement data, step 70. The first mobile device 28 receives the services advertisement data and responds with signaling data, step 75, as described above with reference to FIG. 2. The terminal 12 receives the signaling data and relays the signaling data to the origin server 26. The origin server 26 then adds the first mobile device 28 to the multicast group, step 85. At this point, multicast data may be sent to all three devices in the multicast group, step 90.

Figure 4:
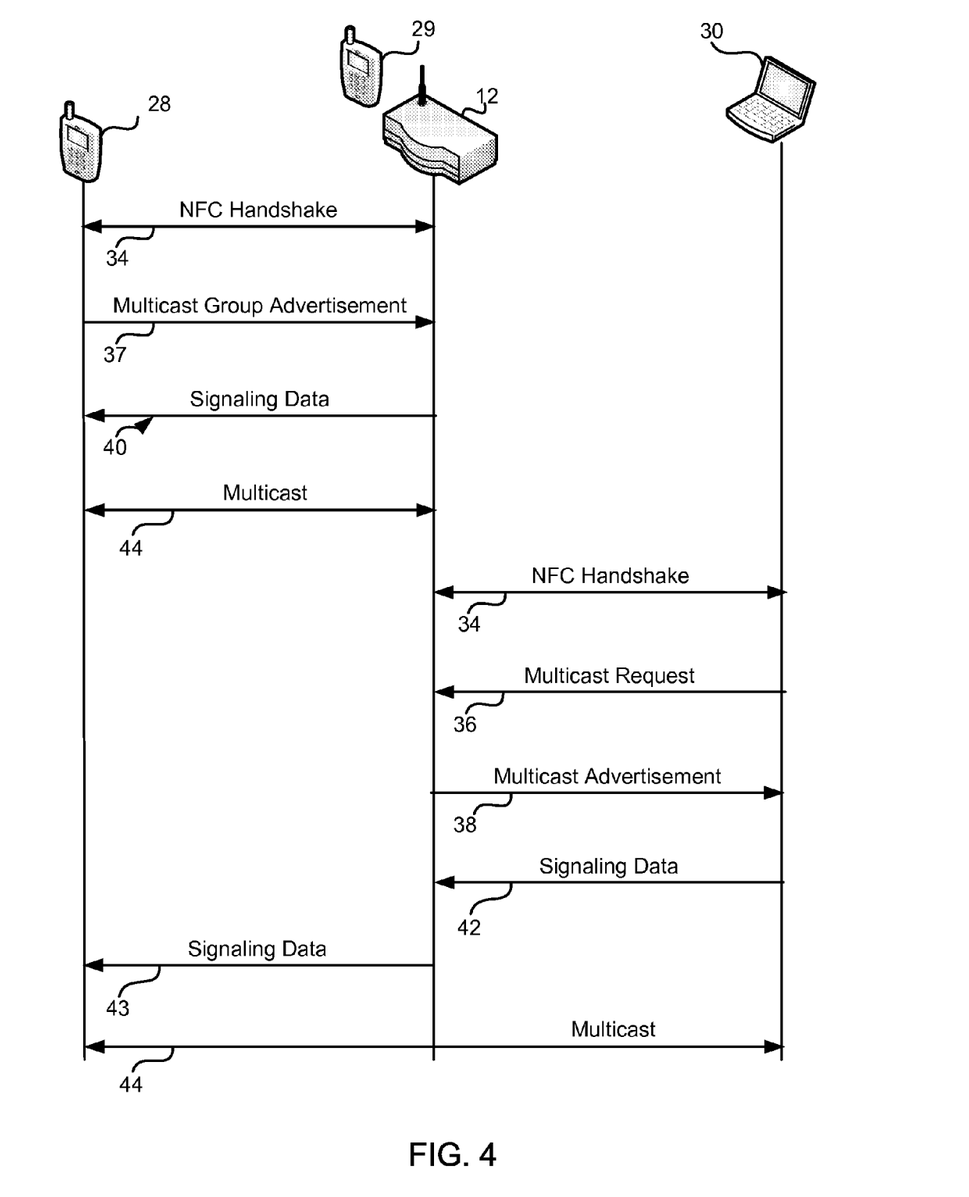
FIG. 4 is a message flow diagram of an embodiment for establishing a multicast group.

The various embodiments allow users to quickly establish a multicast group by bringing various devices in close proximity, as illustrated in FIG. 4. To establish a multicast group, a user brings a first mobile device 28 in close proximity with a second mobile device 29 or terminal 12. Once in close proximity, the devices exchange the close range communication handshake messages necessary to establish the close range communication link 4, messages 34. With the close range communication link 4 established, one of the devices (for example first mobile device 28 as illustrated in FIG. 4) may initiate a multicast group, such as by sending to the other device a multicast group advertisement, message 37. The process of establishing a multicast group may also involve exchanging a series of multicast group advertisement and negotiation messages. As part of establishing the multicast group, the second mobile device 29 or terminal 12 may provide its signaling data, message 40. At this point, a multicast group including the two devices is established and multicast messages may be exchanged, messages 44. To add another device to the multicast group, such as a laptop 30, the laptop 30 and the terminal 12 (or second mobile device 29) are brought into close proximity to establish a wireless close range communications link 4 using one of the known close range communications techniques, messages 34. It should be appreciated, that the laptop 30 could also have been brought into close proximity with the first mobile device 28, in which case the close range communication handshaking messages 34 would have been exchanged between the laptop 30 and the first mobile device 28. Over the established close range communications link 4, the laptop 30 may request multicast group services advertisement data from the terminal 12 (or second mobile device 29), message 36. As noted above, the laptop 30 may make this request on its own initiative, such as a standard communication transmitted each time a close range communication link 4 is establish. Alternatively, the terminal 12 may inform the laptop 30 that the terminal 12 is a member of an established multicast group as part of or following the close range communication establishment handshake communication messages 34. Alternatively, terminal 12 may notify the first device 28 that it is capable of sending a multicast group services advertisement.

The terminal 12 may respond to a multicast group services advertisement data request message 36 with services advertisement data corresponding to the established multicast group, message 38. The multicast group services advertisement data message 38 includes the network, addressing and security data that the laptop 30 needs to begin receiving multicast messages. The multicast group services advertisement data message 38 may also comprise a number of messages from the terminal 12 and, optionally, acknowledgement messages from the laptop 30. It should be recognized that the specific communications between the terminal 12 and the laptop 30 may vary, depending on the configurations of the terminal 12 and the laptop 30. For example, the terminal 12 may be configured to send the multicast service advertisement data over the close range communication link 4 without being prompted by the laptop 30.

The laptop 30 may also transmit address, configuration and other signaling data that will enable the first mobile device 28 or the terminal 12 (depending upon which device is managing the multicast group) to properly add the laptop 30 to the multicast group. For example, the laptop 30 may provide its IP address, its available network communication capabilities (such as whether it has a wired or wireless data connections, as well as the communication protocol version associated with each communication capability) and its communication encryption capabilities. An example of such signaling data is shown in FIG. 6, which is explained in more detail below. Such signaling data may be sent through the wireless close range communications link 4 to the terminal 12, message 42, and relayed by the terminal 12 to the first mobile device 28, message 43. Alternatively, the laptop 30 may communicate the signaling data directly to the first mobile device 28, such as through the Internet 24 or via a cellular data network. For example, once the laptop 30 has received the multicast group services advertisement data, it may use the received data to contact the first mobile device 28 directly to announce it is joining the group. Once the first mobile device 28 receives the signaling data, the multicast group may be expanded to include the laptop 30. Thereafter, any member of the multicast group may send multicast data to rest of the multicast group including the laptop 30, messages 44.

Figure 5:
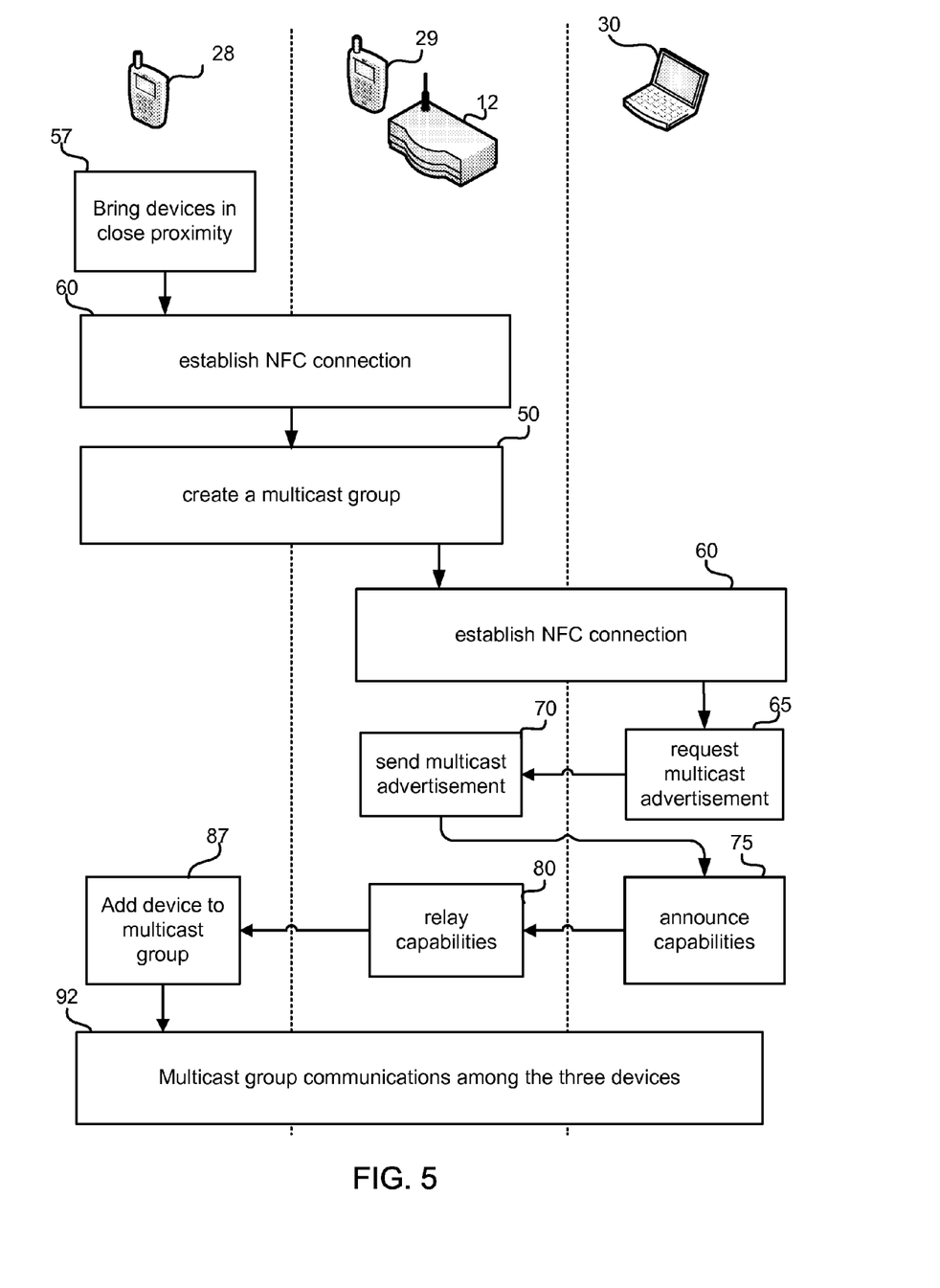
FIG. 5 is a process flow diagram of an embodiment method suitable for establishing a multicast group.

This method is illustrated in FIG. 5, which shows various steps that can be implemented among various devices to quickly establish a multicast group. When a user decides to establish a multicast group, the user brings two devices to be included in the group into close proximity, step 57. For example as illustrated in FIG. 5, such devices may be a first mobile device 28 and a second mobile device 29 or a terminal 12. Bringing the first mobile device 28 and the terminal 12 into close proximity causes the devices to automatically establish a close range communication link, step 60. Once the close range communication link 4 is established, the first mobile device 28 and the terminal 12 exchange messages to create a multicast group using a known method, step 50. A second device, such as a laptop computer 30 can then be added to the multicast group by bringing the laptop 30 into close proximity with either the first mobile device 28 or the terminal 12. In the example shown in FIG. 5, the laptop computer 30 is brought into close proximity with the terminal 12, causing the two devices to establish a close range communication link 4 with each other, step 60. As discussed above, close range communications link 4 is established automatically as soon as the two devices are within communication range using one of the various close range communications technologies (e.g., NFC protocols). When the close range communication link 4 is established, the laptop 30 sends a request for a multicast group services advertisement over the link, step 65. As noted above, this step 65 of requesting the multicast group services advertisement may be performed automatically in response to establishing the close range communication link 4, or may be accomplished in response to receiving information from the terminal 12 that a multicast group is established which the laptop 30 can join. The terminal 12 receives the services advertisement request and responds with services advertisement data, step 70. The laptop 30 receives the services advertisement data and responds with signaling data, step 75, as described above with reference to FIG. 2. The terminal 12 receives the signaling data and relays the signaling data to the first mobile device 28. The laptop 30 is then added to the multicast group by the first mobile device 28 or the terminal 12, depending upon which of the two devices is managing the multicast group, step 87. At this point, multicast data may be sent to all three devices in the multicast group, step 92.

As described above, as part of joining a device to a multicast group, the joining device may communicate with signaling data that the other members of the multicast group can use to communicate with it. An example data structure of such signaling data is shown in FIG. 6. FIG. 6 shows the data structure in extensible markup language (XML) format. It should be recognized that a variety of data structures may be implemented in the various embodiments, the claims should not be limited to a particular format or content of signaling data. For example, the data structure may contain data relating to how the first mobile device 28 can communicate with the members of the multicast group, and vice versa. In some implementations, the first mobile device 28 is able to receive multicast data over the Internet, and may therefore include in the signaling data a data element 110 that provides the Internet Protocol address of the first mobile device 28. In some implementations, the first mobile device 28 may also be capable of receiving multicast data over a CDMA cellular network, and therefore may include in the signaling data a data element 115 containing the cellular telephone number of the first mobile device 28. In some implementations, the first mobile device 28 will be capable of receiving multicast data over various wired and wireless communication protocols (e.g., Bluetooth®, IEEE 802.11g (WiFi) and IEEE 1394 (FireWire®)), which may also be including as data elements in the signaling data in a manner similar to the data structures 110, 115.

Figure 7:
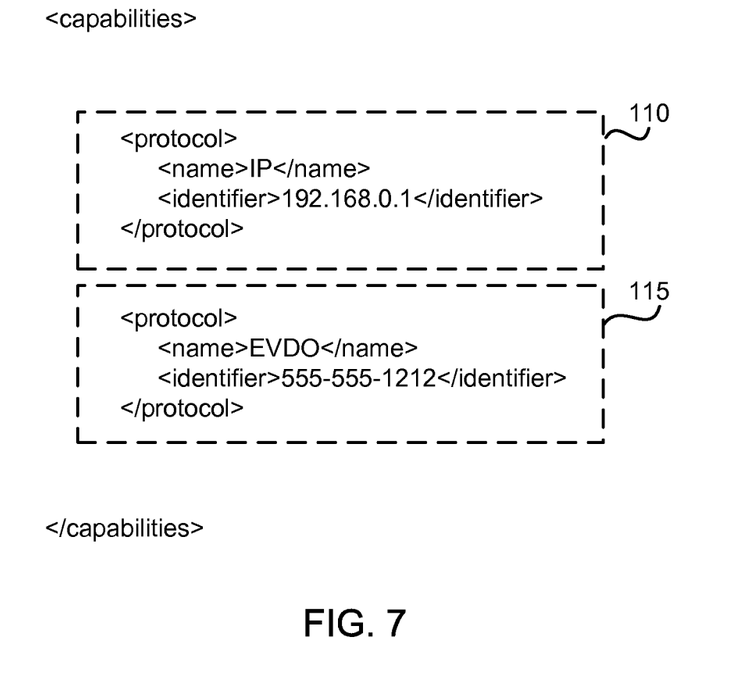
FIG. 7 is a message flow diagram of an embodiment for removing a device from an established multicast group.

In an embodiment, users may remove devices from a multicast group by following a reverse process, as summarized in FIG. 7. For example, if a first mobile device 28 is a member of a multicast group including a terminal 12 and an origin server 26, all exchanging multicast messages 44, a user may press a button or otherwise perform an operation on the first mobile device 28 to indicate a desire to leave the multicast group. The first mobile device 28 can then communicate the desire to leave the multicast group to all members of the group using the established multicast group communication link, messages 45. Then, to complete the process, the user may bring the first mobile device 28 into close proximity with the terminal 12 to enable the devices to establish a close range communication link by exchanging handshake messages 34. Once the close range communication link 4 is established, the first mobile device 28 can communicate or confirm the desire to leave the multicast group to the terminal 12 over that close range communications link, message 46. The terminal 12 can then communicate a confirmation message to the other members of the multicast group that the first mobile device 28 has confirmed its desire to leave the multicast group by establishing the close range communication link 4, message 47.

Alternatively, users may first signal to the multicast group a desire to remove the first mobile device 28 from the group by bringing it into close proximity with the terminal 12. Once in close proximity, the two devices establish a close range communication link 4 as described above. With the close range communication link 4 established, the user may press a button or perform a similar operation on the first mobile device 28 to indicate the desire to leave the multicast group. This indication of a desire to leave the multicast group may also be accomplished before the devices are brought into close proximity. The desire to leave the multicast group may then be communicated by the first mobile device 28 to the terminal 12 using the close range communication link 4. The terminal 12 can then inform the rest of the multicast group that the first mobile device 28 is no longer a member of the group.

Including a step of creating a close range communication link in order to remove a device from a multicast group provides an added layer of security in the form of a physical movement (i.e., bringing the departing device into close proximity with the terminal 12). This added step reduces the chance that devices are inadvertently dropped from a multicast group. Of course, devices may also exit a multicast group by being turned off or transmitting multiple messages communicating a desire to leave the group via the established multicast group communication link.

The embodiments described above may be implemented on any of a variety of mobile handsets, such as, for example, cellular telephones, personal data assistants (PDA) with cellular telephone, mobile electronic mail receivers, mobile web access devices, and other processor equipped devices that may be developed in the future that connect to a wireless network. Typically, such mobile handsets will have in common the components illustrated in FIG. 8. For example, the mobile handset 170 may include a processor 171 coupled to internal memory 172 and a display 173. Additionally, the mobile handset 170 will have an antenna 174 for sending and receiving electromagnetic radiation that is connected to a wireless data link and/or cellular telephone transceiver 175 coupled to the processor 171. In some implementations, the transceiver 175 and portions of the processor 171 and memory 172 used for cellular telephone communications is referred to as the air interface since it provides a data interface via a wireless data link. Additionally, the mobile handset 170 will include a close range communications transceiver 178 capable of establishing and communicating a close range communication link, such as an NFC protocol transceiver configured to use one of the NFC protocols.

Figure 8:
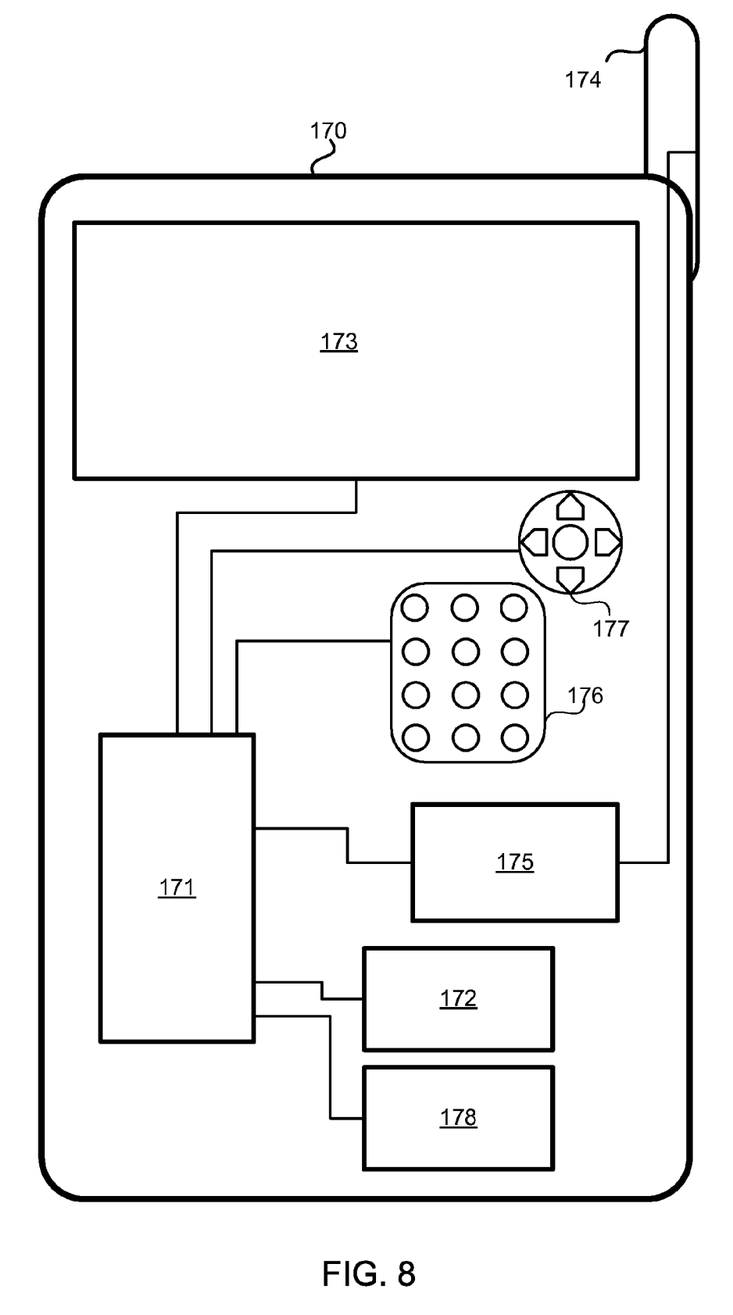
FIG. 8 is a circuit block diagram of an example mobile device suitable for use with the various embodiments.

The processor 171 may be any programmable microprocessor, microcomputer or multiple processor chip or chips that can be configured by software instructions (applications) to perform a variety of functions, including the functions of the various embodiments described above. In some mobile handsets, multiple processors 171 may be provided, such as one processor dedicated to wireless communication functions and one processor dedicated to running other applications. Typically, software applications may be stored in the internal memory 172 before they are accessed and loaded into the processor 171. In some mobile handsets, the processor 171 may include internal memory sufficient to store the application software instructions. For the purposes of this description, the term memory refers to all memory accessible by the processor 171, including internal memory 172 and memory within the processor 171 itself. User data files are typically stored in the memory 172. In many mobile handsets, the memory 172 may be a volatile or nonvolatile memory, such as flash memory, or a mixture of both. Mobile handsets typically include a key pad 176 or miniature keyboard and menu selection buttons or rocker switches 177 for receiving user inputs.

In one or more exemplary embodiments, the functions described may be implemented in hardware, software, firmware, or any combination thereof. If implemented in software, the functions may be stored or transmitted as one or more instructions or codes on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

I claim:

1. A method for joining a first communications device to a multicast group over a multicast communication link, comprising:

establishing a close range communications peer-to-peer (P2P) link using a self establishing near field communication (NFC) protocol between the first communications device and a second communications device which is already a member of the multicast group, wherein establishing the close range communication P2P link uses a wireless proximity-limited communication technology that requires the first communications device and the second communications device to be within about twenty centimeters of each other;

exchanging multicast group services advertisement data pertaining to the multicast group between the second communications device and the first communications device using the close range communications P2P link, wherein the multicast group services advertisement data comprises:

multicast group information required for the first communications device to join the multicast group; and security or encryption information from the second communications device needed for the first communications device to access the multicast communication link so as to establish the multicast communication link with the multicast group over a longer range communications link different from the close range communication P2P link; and joining the first communications device to the multicast group based on the multicast group services advertisement data;
wherein joining the first communications device to the multicast group based on the multicast group services advertisement data comprises:
sending signaling data pertaining to a communications capability of the first communications device from the first communications device to the second communications device; and
sending the signaling data from the second communications device to another member of the multicast group;
wherein the signaling data is sent from the first communications device to the second communications device over the close range communications P2P link.

2. The method of claim 1, wherein joining the first communications device to the multicast group based on the multicast group services advertisement data comprises:
sending signaling data pertaining to a communications capability of the first communications device to another member of the multicast group.

3. The method of claim 1, further comprising:
sending a request for a multicast group services advertisement from the first communications device to the second communications device.

4. The method of claim 1, wherein the close range communication P2P link is compliant with a protocol selected from the group consisting of:
ISO/IEC 14443, ISO/IEC 15693, ISO/IEC 18092, ISO/IEC 21481, ISO/IEC 22536, ISO/IEC 23917, ISO/IEC DIS 28361, ECMA-340, ECMA-352, ECMA-356, ECMA-362, ECMA-373, ECMA/TC32-TG19/2006/057, NFC-WI, and NFC-FEC.

5. A mobile device, comprising:
a processor;
a first transceiver coupled to the processor, the first transceiver configured to establish a long range communication link;
a second transceiver coupled to the processor, the second transceiver being a close range communication transceiver that uses a wireless proximity-limited near field communication (NFC) protocol communication technology that is self establishing and requires other communications devices to be within about twenty centimeters of the mobile device to establish communications; and
a memory coupled to the processor,
wherein the processor is configured with software instructions to perform steps comprising:
establishing a close range communications peer-to-peer (P2P) link between the mobile device and a communications device via the second transceiver;
exchanging information comprising multicast group information required for the mobile device to join the multicast group over the close range communications peer-to-peer (P2P) link between the mobile device and the communications device via the second transceiver;
exchanging, over the close range communications peer-to-peer (P2P) link between the mobile device and the communications device via the second transceiver, security or encryption information needed to access a multicast communication link so as to establish the multicast communication link with a multicast group via the first transceiver over the longer range communications link different from the close range communication P2P link; and
joining the multicast group based on the exchanged information communicated over the close range communications P2P link, wherein multicast group communications are sent and received via the first transceiver over the longer range communications link;
wherein joining the mobile device to the multicast group based on the exchanged information communicated over the closer range communications P2P link comprises:
sending signaling data pertaining to a communications capability of the mobile device from the mobile device to the communications device; and
sending the signaling data from the communications device to another member of the multicast group;
wherein the signaling data is sent from the mobile device to the communications device over the close range communications P2P link.

6. The mobile device of claim 5, wherein the processor is configured with software instructions such that exchanging multicast group information and exchanging security or encryption information comprises: receiving, over the close range communications P2P link, a multicast group services advertisement pertaining to the multicast group from the communications device which is already a member of the multicast group
wherein the multicast group services advertisement comprises the multicast group information and security or encryption information and joining the multicast group comprises joining the mobile device to the multicast group based on the received multicast group services advertisement.

7. The mobile device of claim 6, wherein the processor is configured with software instructions to perform steps further comprising:
sending signaling data pertaining to a communications capability of the mobile device to another member of the multicast group.

8. The mobile device of claim 6, wherein the processor is configured with software instructions to perform steps further comprising:
sending signaling data pertaining to a communications capability of the mobile device to the communications device over the close range communications P2P link.

9. The mobile device of claim 6, wherein the processor is configured with software instructions to perform steps further comprising:
sending a request for the multicast group services advertisement to the communications device over the close range communications P2P link.

10. The mobile device of claim 5, wherein the processor is configured with software instructions such that exchanging multicast group information and exchanging security or encryption information comprises:
sending, over the close range communications P2P link, a multicast group services advertisement pertaining to creating a multicast group to the communications device,
wherein the multicast group services advertisement comprises the multicast group information and security or encryption information and joining the multicast group comprises establishing the multicast group including the mobile device and the communications device based on the multicast group services advertisement.

11. The mobile device of claim 10, wherein the processor is configured with software instructions to perform steps further comprising:

receiving from the communications device over the close range communications P2P link signaling data pertaining to a communications capability of the communications device.

12. The mobile device of claim 5, wherein the processor is configured with software instructions to perform steps further comprising:
sending to the communications device over the close range communications P2P link a multicast group services advertisement pertaining to an established multicast group of which the mobile device is a member,
wherein the multicast services advertisement comprises the multicast group information and security or encryption information and joining the multicast group comprises joining the communication device to the multicast group including the mobile device based on the multicast group services advertisement.

13. The mobile device of claim 12, wherein the processor is configured with software instructions to perform steps further comprising:
receiving a request for a multicast group services advertisement from the communications device over the close range communications P2P link.

14. The mobile device of claim 6, wherein the processor is configured with software instructions to perform steps further comprising:
sending a disconnect message to the communications device via the close range communication P2P link.

15. The mobile device of claim 6, wherein the close range communications P2P link is compliant with a protocol selected from the group consisting of:
ISO/IEC 14443, ISO/IEC 15693, ISO/IEC 18092, ISO/IEC 21481, ISO/IEC 22536, ISO/IEC 23917, ISO/IEC DIS 28361, ECMA-340, ECMA-352, ECMA-356, ECMA-362, ECMA-373, ECMA/TC32-TG19/2006/057, NFC-WI, and NFC-FEC.

16. A non-transitory storage medium having stored thereon processor-executable software instructions configured to cause a processor of a mobile device to perform steps comprising:
establishing a close range communication peer-to-peer (P2P) link using a self establishing near field communication (NFC) protocol between the mobile device and a communications device, wherein establishing the close range communication P2P link is wireless and requires the mobile device and the communications device to be within twenty centimeters of each other;
exchanging, via the close range communication P2P link, information comprising multicast group information required to join a multicast group, and security or encryption information from the communications device needed for the mobile device to access a multicast communication link so as to establish the multicast communication link with the multicast group; and
joining the mobile device via the multicast communication link to a multicast group communicating over a longer range communication link different from the close range communication P2P link based on the exchanged information communicated over the close range communications P2P link;
wherein joining the mobile device to the multicast group based on the exchanged information communicated over the close range communications P2P link comprises:
sending signaling data pertaining to a communications capability of the mobile device from the mobile device to the communications device; and sending the signaling data from the communications device to another member of the multicast group;
wherein the signaling data is sent from the mobile device to the communications device over the close range communications P2P link.

17. The non-transitory storage medium of claim 16, wherein the stored software instructions are configured to cause a processor to perform further steps comprising:
receiving, over the close range communications P2P link, multicast group services advertisement data pertaining to the multicast group from the communications device which is already a member of the multicast group,
wherein the multicast group services advertisement data comprises the multicast group information and security or encryption information, and joining the mobile device to the multicast group comprises joining the mobile device to the multicast group over the longer range communication link based on the received multicast group services advertisement data.

18. The non-transitory storage medium of claim 17, wherein the stored software instructions are configured to cause a processor to perform further steps comprising:
sending signaling data pertaining to a communications capability of the mobile device to another member of the multicast group.

19. The non-transitory storage medium of claim 17, wherein the stored software instructions are configured to cause a processor to perform further steps comprising:
sending signaling data pertaining to a communications capability available to the processor to the communications device over the close range communications P2P link.

20. The non-transitory storage medium of claim 17, wherein the stored software instructions are configured to cause a processor to perform further steps comprising:
sending a request for a multicast services advertisement to the communications device over the close range communications P2P link.

21. The non-transitory storage medium of claim 16, wherein the stored software instructions are configured to cause a processor to perform further steps comprising:
sending, over the close range communications P2P link, multicast group services advertisement data pertaining to creating a multicast group to the communications device,
wherein the multicast group services advertisement data comprises the multicast group information and security or encryption information, and joining the multicast group comprises establishing the multicast group including the mobile device and the communications device based on the multicast group services advertisement data.

22. The non-transitory storage medium of claim 21, wherein the stored software instructions are configured to cause a processor to perform further steps comprising:
receiving from the communications device over the close range communications P2P link signaling data pertaining to a communications capability of the communications device.

23. The non-transitory storage medium of claim 16, wherein the stored software instructions are configured to cause a processor to perform further steps comprising:
sending to the communications device over the close range communications P2P link multicast group services advertisement data pertaining to an established multicast group of which the mobile device is a member, wherein the multicast group services advertisement data comprises the multicast group information and security or encryption information, and joining the multicast group comprises joining the communication device to the multicast group including the mobile device based on the multicast group services advertisement data.

24. The non-transitory storage medium of claim 23, wherein the stored software instructions are configured to cause a processor to perform further steps comprising:
receiving a request for a multicast services advertisement from the communications device over the close range communications P2P link.

25. The non-transitory storage medium of claim 17, wherein the stored software instructions are configured to cause a processor to perform further steps comprising:
sending a disconnect message to the communications device via the close range communication P2P link.

26. A mobile device, comprising:
means for establishing a close range communications peer-to-peer (P2P) link using a self establishing near field communication (NFC) protocol between the mobile device and a communications device, wherein the close range communication P2P link is wireless and requires the mobile device and the communications device to be within twenty centimeters of each other;
means for exchanging, via the close range communication P2P link, information comprising multicast group information required to join a multicast group, and security or encryption information from the communications device needed for the mobile device to access a multicast communication link so as to establish the multicast communication link with a multicast group over a longer range communications link different from the close range communication P2P link; and
means for joining the mobile device via the multicast communication link to a multicast group over the longer range communication link based on the exchanged information communicated over the close range communications P2P link;
wherein joining the mobile device to the multicast group based on the exchanged information communicated over the close range communications P2P link comprises:
sending signaling data pertaining to a communications capability of the mobile device from the mobile device to the communications device; and
sending the signaling data from the communications device to another member of the multicast group;
wherein the signaling data is sent from the mobile device to the communications device over the close range communications P2P link.

27. The mobile device of claim 26, further comprising:
means for receiving, over the close range communications P2P link, multicast group services advertisement data pertaining to the multicast group from the communications device which is already a member of the multicast group,
wherein the multicast group services advertisement data comprises the multicast group information and security or encryption information and means for joining the mobile device to the multicast group comprises means for joining the mobile device to the multicast group based on the received multicast group services advertisement data.

28. The mobile device of claim 27, further comprising:
means for sending signaling data pertaining to a communications capability of the mobile device to another member of the multicast group.

29. The mobile device of claim 27, further comprising:
means for sending signaling data pertaining to a communications capability of the mobile device to the communications device.

30. The mobile device of claim 27, further comprising:
means for sending a request for a multicast services advertisement to the communications device over the close range communications P2P link.

31. The mobile device of claim 26, further comprising:
means for sending, over the close range communications P2P link, a multicast services advertisement pertaining to creating a multicast group from the communications device,
wherein the multicast services advertisement comprises the multicast group information and security or encryption information, and the means for joining the mobile device to the multicast group comprises means for establishing the multicast group including the mobile device and the communications device based on the multicast services advertisement.

32. The mobile device of claim 31, further comprising:
means for receiving, over the close range communications P2P link, signaling data pertaining to a communications capability of the communications device.

33. The mobile device of claim 26, further comprising:
means for sending to the communications device over the close range communications P2P link a multicast services advertisement pertaining to an established multicast group of which the mobile device is a member,
wherein the multicast services advertisement comprises the multicast group information and security or encryption information, and the means for joining the mobile device to the multicast group comprises means for joining the communication device to the multicast group including the mobile device based on the multicast services advertisement.

34. The mobile device of claim 32, further comprising:
means for receiving a request for a multicast services advertisement from the communications device over the close range communications P2P link.

35. The mobile device of claim 27, further comprising:
means for sending a disconnect message to the communications device via the close range communication P2P link.

36. The mobile device of claim 26, wherein the means for establishing a close range communications P2P link between the mobile device and a communications device comprises means for establishing communication link compliant with a protocol selected from the group consisting of:
ISO/IEC 14443, ISO/IEC 15693, ISO/IEC 18092, ISO/IEC 21481, ISO/IEC 22536, ISO/IEC 23917, ISO/IEC DIS 28361, ECMA-340, ECMA-352, ECMA-356, ECMA-362, ECMA-373, ECMA/TC32-TG19/2006/057, NFC-WI, and NFC-FEC.

37. The method of claim 1, wherein: the multicast communication link comprises a wireless network; and
exchanging the multicast group services advertisement data comprises receiving an encryption key for the wireless network in the first communications device from the second communications device.

38. The mobile device of claim 5, wherein: the multicast communication link comprises a wireless network; and
the processor is configured with software instructions to perform steps such that exchanging the multicast group services advertisement data comprises receiving an encryption key for the wireless network in the mobile device from the communications device.

39. The non-transitory storage medium of claim 16, wherein:
the multicast communication link comprises a wireless network; and the stored processor-executable software instructions are configured to cause the processor of a mobile device to perform steps such that exchanging the multicast group services advertisement data comprises receiving an encryption key for the wireless network in the mobile device from the second communications device.

40. The mobile device of claim 26, wherein: the multicast communication link comprises a wireless network; and
means for exchanging the multicast group services advertisement data comprises means receiving an encryption key for the wireless network from the communications device.

* * * * *